US007014831B2

United States Patent
Eicher et al.

(10) Patent No.: US 7,014,831 B2
(45) Date of Patent: Mar. 21, 2006

(54) PURIFICATION OF SULFURYL FLUORIDE

(75) Inventors: Johannes Eicher, Sehnde-Iiten (DE); Matthias Marek, Offenau (DE); Lore Hirsch, Bad Friedrichshall (DE)

(73) Assignee: Solway Fluor und Derivate GmbH, Hannover (DE)

( * ) Notice: Subject to any disclaimer, the term of this patent is extended or adjusted under 35 U.S.C. 154(b) by 0 days.

(21) Appl. No.: 10/912,573

(22) Filed: Aug. 6, 2004

(65) Prior Publication Data

US 2005/0022664 A1    Feb. 3, 2005

Related U.S. Application Data

(63) Continuation of application No. PCT/EP03/00917, filed on Jan. 30, 2003.

(30) Foreign Application Priority Data

Feb. 7, 2002   (DE) ................................ 102 04 935

(51) Int. Cl.
    *C01B 17/45* (2006.01)
(52) U.S. Cl. ...................... 423/468; 423/240 S; 95/137
(58) Field of Classification Search ............ 423/240 S, 423/467, 468; 95/135, 137
See application file for complete search history.

(56) References Cited

U.S. PATENT DOCUMENTS

| 3,320,030 | A  | * | 5/1967  | Bisignani et al. ........... 423/466 |
| 3,996,029 | A  |   | 12/1976 | Gustafson et al. |
| 4,102,987 | A  |   | 7/1978  | Cook et al. |
| 4,465,655 | A  | * | 8/1984  | Geisler et al. .......... 423/240 R |
| 4,950,464 | A  |   | 8/1990  | Fujioka et al. |
| 6,143,269 | A  | * | 11/2000 | Schulz et al. ............... 423/468 |
| 6,224,840 | B1 |   | 5/2001  | Kim et al. |
| 2003/0047069 | A1 | * | 3/2003 | Belt et al. ...................... 95/48 |
| 2004/0131536 | A1 | * | 7/2004 | Belt et al. ................ 423/512.1 |

FOREIGN PATENT DOCUMENTS

| DE | 4343689  | 10/1994 |
| DE | 4441628  | 5/1996  |
| DE | 10111302 | 9/2002  |

* cited by examiner

*Primary Examiner*—Ngoc-Yen Nguyen
(74) *Attorney, Agent, or Firm*—Crowell & Moring LLP

(57) ABSTRACT

Sulfuryl fluoride, which is useful as a fumigant, may be contaminated with sulfur dioxide and possibly other impurities such as sulfuryl chloride, depending on the way it is produced. According to the invention, sulfur dioxide and, if applicable, sulfuryl chloride fluoride are removed from a contaminated sulfuryl fluoride product by using aluminum oxide as an adsorbing agent. The method of the invention is highly advantageous because it eliminates the need to use activated carbon as an additional adsorbent.

8 Claims, No Drawings

PURIFICATION OF SULFURYL FLUORIDE

CROSS REFERENCE TO RELATED APPLICATIONS

This application is a continuation of international patent application no. PCT/EP03/00917, filed Jan. 30, 2003, designating the United States of America, and published in German as WO 03/066520 A1, the entire disclosure of which is incorporated herein by reference. Priority is claimed based on Federal Republic of Germany patent application no. DE 102 04 935.1, filed Feb. 7, 2002.

BACKGROUND OF THE INVENTION

The invention relates to a method for the preparation of purified sulfuryl fluoride from sulfuryl fluoride which is contaminated with sulfur dioxide.

Sulfuryl fluoride is a fumigant and is used, for example, in museums. It can be prepared from sulfur dioxide, chlorine and hydrogen fluoride in the presence of catalysts. Due to the method of preparation, and also with other methods of preparation, or due to the application, the produce sulfuryl fluoride may contain sulfur dioxide as a contaminant. It is desirable to remove the sulfur dioxide from the sulfuryl fluoride which is contaminated with it.

U.S. Pat. No. 4,950,464 teaches that thionyl fluoride, acidic components, water and "certain other impurities" can be removed with activated aluminum oxide. According to this U.S. patent, sulfur dioxide, hydrogen fluoride, chlorinated hydrocarbons and certain other impurities can be removed with activated charcoal. The adsorbents can also be used consecutively.

SUMMARY OF THE INVENTION

It is an object of the present invention to provide an improved method of purifying sulfuryl fluoride.

Another object of the invention is to provide a purification method for purifying sulfuryl fluoride which contains sulfur dioxide.

A further object of the invention is to provide a method of purifying sulfuryl fluoride which is simplified compared to prior methods.

These and other objects are achieved in accordance with the present invention by providing a method of purifying sulfuryl fluoride which is contaminated with sulfur dioxide, said method comprising contacting the contaminated sulfuryl fluoride with aluminum oxide as an adsorbent to adsorb sulfur dioxide, and recovering a purified sulfuryl fluoride having a decreased sulfur dioxide content.

According to the method of the invention for preparing purified sulfuryl fluoride from sulfuryl fluoride which is contaminated with sulfur dioxide, the sulfuryl fluoride which is contaminated with sulfur dioxide is contacted with aluminum oxide in an adsorption step in order to remove sulfur dioxide. Preferably, activated aluminum oxide is used.

The aluminum oxide can be used in any form, for example, as a granulate or as a powder. Its function is to adsorb the sulfur dioxide. Other contaminants, such as thionyl fluoride, acidic components, water and sulfuryl chloride fluoride, if present, are also adsorbed. Activated charcoal is not required, especially if the manufacturing process is not responsible for the presence of chlorinated hydrocarbons. Preferably, therefore, activated charcoal is not used and, from the point of view of a production process, the use of a single type of adsorbent is, of course, advantageous.

Naturally, a plurality of adsorption steps with aluminum oxide can also be provided. The purification method according to the present invention using an aluminum oxide adsorption step can, of course, also be combined with conventional purification measures, such as contacting with purifying solutions such as water, weakly alkaline solutions, especially aqueous, weakly alkaline solutions, or with an oxidative wash, for example, with a hydrogen peroxide solution.

In accordance with a preferred embodiment, the sulfuryl fluoride is contacted initially with an oxidative wash, preferably an aqueous hydrogen peroxide solution. Subsequently, the sulfuryl fluoride which has been pre-treated with such an oxidative wash, is passed through one or more aluminum oxide absorbent steps.

The contacting of the sulfuryl fluoride with aluminum oxide is usually carried out at a temperature ranging from −30° C. to +100° C. and preferably at ambient temperature, and at a pressure ranging from 0 to 20 bar and preferably at ambient pressure, especially in the gas phase.

The method of the invention has the advantage that only one type of absorbent, namely aluminum oxide, has to be used. Sulfur dioxide and other contaminants, such as sulfuryl chloride fluoride, can be removed reliably.

The following examples are intended to illustrate the invention in further detail without limiting its scope.

General:

The aluminum oxide used in the following examples was Compalox® (AN/V-850) aluminum oxide, a commercial product obtainable from Martinswerk GmbH, Bergheim, Germany. It is a substantially pure, active, granular aluminum oxide.

| | |
|---|---|
| Average analysis: | 90% by weight of $Al_2O_3$ |
| Loss on ignition: | 9% by weight |
| Pore volume: | 0.35 cc/g |
| Specific surface area: | 200–260 $m^2$/g |
| Standard range of grain sizes: | 5–10 mm |
| Bulk density: | 850 $kg/m^3$ |

Other aluminum oxides, however, could also be used in the invention.

EXAMPLE 1

$SO_2F_2$ Purification, High Initial $SO_2$ Content

A glass tube with a capacity of 250 ml was filled with Compalox® aluminum oxide (200 ml). Sulfuryl fluoride (380 g), containing 250 ppm of sulfur dioxide, was passed through the filled glass tube at a temperature of 20° C. and a pressure of 1 bar abs. The contact time was 3 seconds. After passage through the aluminum oxide, the sulfur dioxide content was found to be 100 ppm (analytical method: GC and Dräger measurement tubes).

EXAMPLE 2

The procedure, analysis and amounts used were as in Example 1, except that the sulfur dioxide content had previously been reduced from 250 ppm to 50 ppm in a hydrogen peroxide washer. The sulfur dioxide content was further reduced by contact with the aluminum oxide from an initial content of 50 ppm to a final sulfur dioxide content of only 32 ppm.

EXAMPLE 3

Large-Scale Experiment, Lower Initial Sulfur Dioxide Content

A steel pipe with a capacity of 100 liters was filled with Compalox® aluminum oxide (85 kg). Sulfuryl fluoride (418 kg), containing 25 ppm of sulfur dioxide, was passed through the filled steel pipe at 20° C. at a pressure of 1 bar abs. The contact time was 20 seconds. After passage through the Compalox®, the sulfur dioxide content was found to be 10 ppm (analytical method: GC and Dräger measurement tubes).

EXAMPLE 4

Final Purification

A further 527 kg of sulfuryl chloride containing 10 to 15 ppm of sulfur dioxide were passed under the same physical conditions through the aluminum oxide which had already been used in Example 3. Since the sulfuryl fluoride used originated from a running sulfuryl fluoride process, different samples were taken at the start and as the production run progressed further. The sulfur dioxide contents after passage through the aluminum oxide were found to be 2 and 8 ppm (analytical method: GC and Dräger measurement tubes).

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of purifying sulfuryl fluoride which is contaminated with sulfur dioxide, said method comprising contacting the contaminated sulfuryl fluoride with aluminum oxide as an adsorbent to adsorb sulfur dioxide, and recovering a purified sulfuryl fluoride having a decreased sulfur dioxide content, wherein aluminum oxide is the only adsorbent.

2. A method according to claim 1, wherein the aluminum oxide is at least substantially pure aluminum oxide.

3. A method according to claim 1, further comprising contacting the sulfuryl fluoride with washing liquid in at least one washing step before or after the adsorption step.

4. A method according to claim 3, wherein said at least one washing step comprises contacting the sulfuryl fluoride with water, a weakly alkaline liquid or an oxidizing liquid before the adsorption step.

5. A method according to claim 2, wherein said at least one washing step is carried out before the adsorption step, and said washing liquid comprises an aqueous hydrogen peroxide solution.

6. A method according to claim 1, wherein the sulfur dioxide-contaminated sulfuryl fluoride also is contaminated with sulfuryl chloride fluoride, and sulfuryl chloride fluoride is also adsorbed by the aluminum oxide to yield a purified sulfuryl fluoride having decreased contents of both sulfuryl dioxide and sulfuryl chloride fluoride.

7. A method according to claim 1, wherein the aluminum oxide is activated aluminum oxide.

8. A method according to claim 1, further comprising subjecting the purified sulfuryl fluoride recovered from the adsorbent contacting step to a further purification.

* * * * *